(12) United States Patent
Shinozuka

(10) Patent No.: US 6,464,589 B1
(45) Date of Patent: Oct. 15, 2002

(54) TRANSVERSE CYLINDRICAL ENGAGEMENT TRIPARTITE FLEXIBLE SHAFT COUPLING

(76) Inventor: Kinzou Shinozuka, 1 - 4 - 7 - 213, Seishincho, Edogawaku, 134 - 0087 Tokyo (JP)

( * ) Notice: Subject to any disclaimer, the term of this patent is extended or adjusted under 35 U.S.C. 154(b) by 0 days.

(21) Appl. No.: 10/014,447

(22) Filed: Dec. 14, 2001

(51) Int. Cl.$^7$ ................................................ F16D 3/04
(52) U.S. Cl. ........................ 464/102; 464/903; 464/153
(58) Field of Search .................... 464/91, 102, 104, 464/105, 106, 110, 147, 153, 903

(56) References Cited

U.S. PATENT DOCUMENTS

| | | | | |
|---|---|---|---|---|
| 481,780 A | * | 8/1892 | Brown | 464/102 |
| 1,182,905 A | * | 5/1916 | Hamilton et al. | 464/102 |
| 1,298,680 A | * | 4/1919 | Dunham | 464/102 |
| 1,829,392 A | * | 10/1931 | Caldwell | 464/105 |
| 2,251,126 A | * | 7/1941 | Gatke | 464/105 |
| 2,260,567 A | * | 10/1941 | Gatke | 464/105 |
| 3,431,751 A | * | 3/1969 | Stokely | 464/104 |
| 4,941,861 A | * | 7/1990 | Painter | 464/102 |
| 5,078,650 A | * | 1/1992 | Foote | 464/104 |
| 5,421,780 A | * | 6/1995 | Vukovic | 464/102 |

* cited by examiner

*Primary Examiner*—Lynne H. Browne
*Assistant Examiner*—Kenneth L. Thompson
(74) *Attorney, Agent, or Firm*—Peter Gibson

(57) ABSTRACT

A flexible shaft couple has two terminal components and one medial component. Each terminal component has a shaft bore open to a nether end face and a transverse extension of an opposed adjacent end face possessing an external substantially cylindrical surface spaced apart from by a reduced width foot. The medial component has two perpendicular transverse cavities each possessing an internal substantially cylindrical surface open to one of two opposed adjacent end faces. Both external and both internal cylindrical surfaces include an equivalent diameter greater than the width of the opening of each transverse cavity which exceeds the width of the reduced width foot. Two perpendicular substantially cylindrical engagements are provided which together accommodate large lateral and large angular shaft misalignments. Each terminal component has a body molded by a radially aligned two part mold leaving a part line bisecting the transverse extension and the reduced width foot. It is suggested that the terminal component bodies be die cast zinc with nickel plating and the medial component be injection molded in thermoplastic with a axially aligned two part mold. Axial and lateral engagement and disengagement is facilitated.

20 Claims, 3 Drawing Sheets

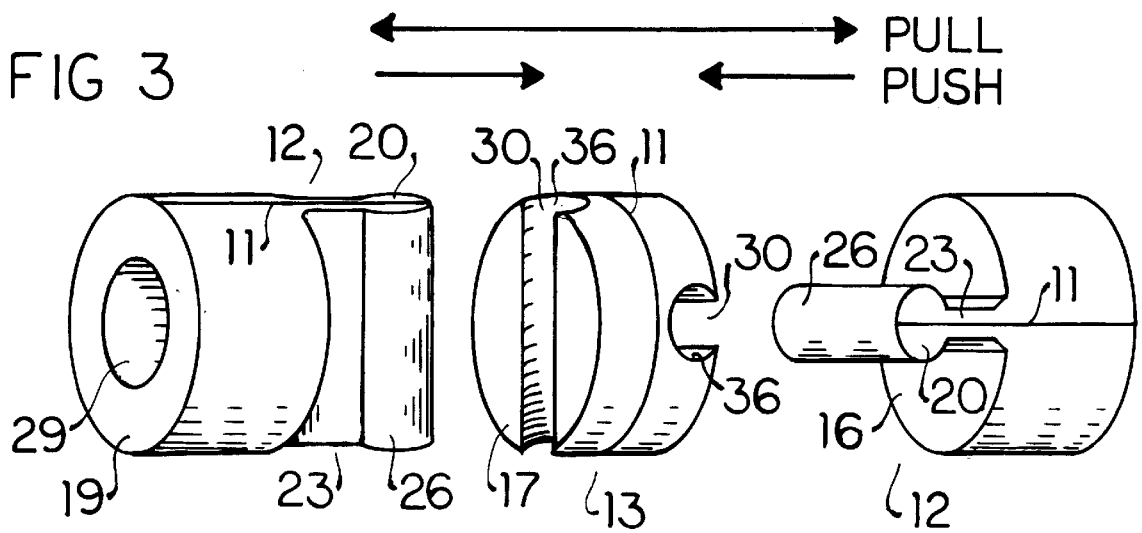
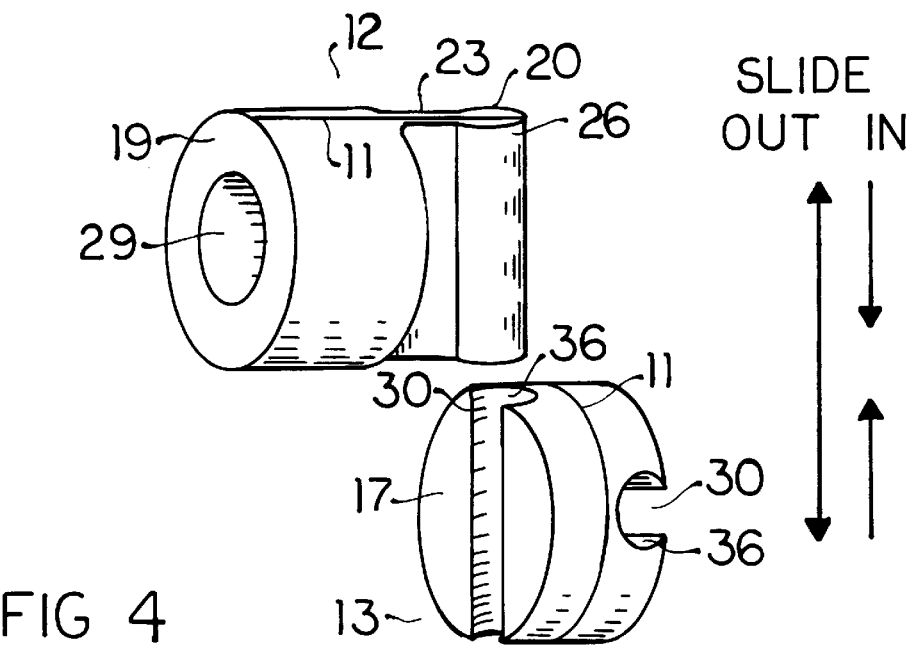

TRANSVERSE CYLINDRICAL ENGAGEMENT TRIPARTITE FLEXIBLE SHAFT COUPLING

BACKGROUND OF THE INVENTION

1. Field of the Invention

The present invention relates generally to flexible couplings for rotary shafts, more particularly to rotary shaft couplings which accommodate misaligned drive axes with radial movement of a transverse cylindrical torque transmitting engagement member, and most specifically to rotary shaft couplings which accommodate misaligned axes with radial movement of a transverse cylindrical torque transmitting engagement member primarily produced by molding.

2. General Background

Oldham type rotary shaft couplings that use a radially moveable torque transmitting engagement member are well known in the art. Modification of the Oldham principle by using a substantially cylindrical engagement member is also known. By using mating male and female members which respectively present a transverse projection and a recess that engage over half of a cylindrical form the coupling can accommodate large parallel, i.e. offset, misalignment of axes while also providing against the axial disconnection inherent to an Oldham type rotary shaft coupling. Given two pairs of perpendicularly opposed male and female mating substantially cylindrical engagement members with sufficient spacing between the three bodies large angular, in addition to large offset, misalignments are readily accommodated.

The male projection must, however, possess a convex substantially cylindrical exterior surface which is further undercut in connection to the body concerned. This is considered a particularly difficult configuration to either machine or mold. The female cavity can easily be effected with an appropriate transverse drilling of the body concerned but replicating the opposite form by machining requires rotation of the body relative to the cutting tool during cutting repeatedly along the entire length of the cylindrical projection desired as the radius of the cutting tool is restricted by the relatively small radius of the cylinder approximated in comparison with the length required of this form.

The undercut required to present the majority of a cylindrical form, moreover, presents problems to molding the male engagement member. Molding of the female engagement member is considered less problematic if no additional undercut is incorporated. The substantially cylindrical cavity must be effected by a machined substantially cylindrical projection and any additional undercut inhibits release of the molded part from this projection.

DISCUSSION OF THE PRIOR ART

An early example of a rotary shaft coupling using substantially cylindrical male and female engagement members is found in U.S. Pat. No. 1,298,680 for a 'Flexible Coupling' issued Apr. 1, 1919 to J. R. Dunham. The female members in this coupling have two perpendicularly disposed substantially cylindrical grooves (5) which intersect. One male member or knuckle rib (4) is also equipped with a similar cylindrical groove (4') to accommodate the opposed knuckle rib (9). The female member is hence essentially a cylindrical body with transverse perpendicular grooves (5) open to opposed faces of the body pivotably encasing the two opposed, engaged, knuckle ribs. Each terminal end has a knuckle rib (4) with a transverse substantially cylindrical groove (4') encased by a female body member. A medial male unit (7) has two opposed knuckle ribs and five components comprise the basic structure of the coupling about which a simple cylindrical shell is disposed to encase the coupling, retain lubrication used thereupon, and limit excessive lateral movement.

A simplification, in the number of components, of this same basic approach is found in U.S. Pat. No. 2,251,126 for a 'Molded Composition Slipper Bearing' issued July 29, 1941 to T. L. Gatke that uses only three components: a female coupling end with a transverse substantially cylindrical groove, a male coupling end with a uniform projection having a transverse cylindrical aperture open to either of two parallel faces, and the slipper bearing which fits in the cylindrical groove of the female coupling end and has a reduced diameter transversely disposed cylindrical pivot through the aperture through the male projection. The slipper bearing is pivotably held in a cylindrical transverse groove of the female coupling end by opposed heads that are semicircular in the plane normal the transverse axis of the groove and transversely elongated parallel that groove to fit the same.

Most significantly, however, the slipper bearing, which possesses a rather complex configuration with two partly and one full cylindrical exterior surfaces, is molded of composition material. Woven fabric, which can be reinforced with wire, provides a core which is laminated with a non-metallic material, i.e. resin, impregnated therein bonding the fabric layers together and providing a hard 'envelope' suited to a bearing surface. The laminated fabric core provides resilient strength for impact resistance. The heads of the slipper bearing are specifically made in this manner and are apparently of one piece with the reduced diameter pivot shaft between the two heads which is further apparently enclosed by the engaging male member. How this construction is achieved is not explained however.

U.S. Pat. No. 2,260,567 issued Oct. 28, 1941 to the same inventor and possessing the same title, though resulting from a separate and earlier application, addresses this practical difficulty by making the slipper bearing from several different components, two heads and the connecting shaft, held together with a nut and bolt and other hardware including washers, bushings, and two hubs between the heads and the cylindrical shaft compressed therebetween. This construction enables practical use of a male member having a through hole open to either of two opposed, flat, parallel faces as the shaft of the bearing can be disposed in this through hole and the heads attached to either end of the shaft with the nut and bolt. The head of the bolt and the nut are each disposed in an open cavity of one head and practical resolution of this 'simplification' is seen to involve over a dozen separate elements assembled together to provide this one component.

U.S. Pat. No. 4,941,861 issued Jul. 17, 1990 to Robert A. Painter for an 'Interlocking Shaft Coupling' discloses use of only three molded plastic components engaging each other with two pairs of substantially cylindrical transverse male and female elements. While the medial 'disk shaped body' is shown (FIG. 2) in an alternative arrangement having two transverse perpendicular substantially cylindrical grooves each open to an opposed face, no mating male elements are shown, and the only full depiction of the coupling utilizes male elements upon the medial component and one mating female element upon each terminal component. It is also noted that the grooves depicted in this alternative medial 'disk shaped body' clearly both possess a depth exceeding half the width of this body and must therefore intersect and prevent engagement by the two male elements necessary for torque transmittal.

This intersection is not depicted though a central hole is depicted in one (FIG. 3) of the versions of this medial 'disk shaped body' with two perpendicular transverse substantially cylindrical male elements which is explained, in the most specific reference found to the molding preferred, as being desirable because "(w)hen plastic is molded, areas with different cross-sectional thicknesses typically cure at different rates" and the overlap of male elements would, absent the 'central hole' be "about one and one-half times as thick as any other part" by which it is understood that the thickness of the medial 'disk shaped body', as depicted in every instance, is approximately equal in thickness to the height of the male element or the depth of the female element. Secondly, this 'hole' serves as a recess for a 'central protrusion' upward from the bottom of each transverse substantially cylindrical groove required to prevent lateral displacement and disengagement of the coupling (FIGS. 4A & 4C, Column 6, Lines 17–59). The use of flats and set screws for securing the shaft in the bore of either terminal component is also clearly shown and described by Painter.

U.S. Pat. No. 5,421,780 issued to Ivan Vukovic Jun. 6, 1995 for a 'Joint Assembly Permitting Limited Transverse Component Displacement' discloses a similar basic arrangement of the same three basic components: two terminal ends each having one transverse substantially cylindrical groove and one medial disk shaped component having two opposed perpendicular transverse substantially cylindrical keys mating the grooves and transmitting torque. Rather than using a 'central protrusion' of the groove fitting in a 'central hole' of the medial disk to retard lateral displacement Vukovic utilizes two springs each axially disposed with respect to one cylindrical key adjustably biased against the same with a set screw at one end and protruding from the other against a sleeve about the cylindrical body of each terminal component.

This chronological review of the prior art considered most pertinent to the present invention suggests two basic areas of difficulty in development of rotary shaft couplings utilizing substantially cylindrical transverse engagement elements: undesired lateral displacement of the engagement members with respect to each other; and a satisfactory method of manufacture.

The earliest references cited relied upon an expensive machined construction of five basic components using four male engagement members engaging each other within two female body components and an exterior sleeve retaining lubrication and limiting excessive lateral displacement. Machining the exterior cylindrical surfaces of the transverse male engagement members, i.e. 'rib knuckles' in this reference, is considered particularly expensive.

The first known use of molded components, which are generally considered to be much less expensive than machined components, apparently did not have a concern with lateral displacement but did have a large concern with practical manufacture and the three piece construction recognized as being the simplest possible use of two perpendicular transverse substantially cylindrical engagements was found to be problematic with the solution requiring a large number of pieces of hardware in addition to the division of one of the three main components into many subsidiary pieces.

The first known rotary shaft coupling utilizing only three main components and two perpendicular transverse substantially cylindrical engagements relied upon a central protrusion of each groove engaging a central hole through the medial component having both male engagement members extending from opposed faces to prevent lateral displacement of the engaging members. This aspect is given detailed treatment in the last reference cited with use of springs adjustably biased against tight fitting sleeves.

The earlier references are noted to differ from the last two in essentially having two male members directly engaged with each other and additionally held, as a double pivot, within a female cavity in contrast to three main components: two terminal and one medial. In both of the later cases the medial component has two opposed male members, each terminal component presents one female engagement, and provision is made for preventing lateral displacement of the engaging members. No viable alternative arrangement in which the medial component has both female engagements is disclosed. Specifics with regard to manufacture by molding are restricted to the observation that widely varying cross sections are to be avoided as causing warping.

The earlier use of molding referenced above used fabric lamination in what is presumed to be a resin molding. This type of molding and material, i.e. thermoset casting, is recognized as generally predating more modern injection molding of thermoplastics which is assumed to be the method utilized for the latter reference specifying construction in plastic as the implied manufacture requires molding under pressure which aspect characterizes injection molding.

Casting is not pressurized, relies upon gravity to fill the mold, and is hence distinguished from injection molding. Both are types of molding and may use a fully enclosed mold but casting can also use an open mold. Casting is unsuited to obtaining complex configurations because of the gravity feed and to molding thermoplastics generally owing to insufficient density of the material. Thermoset plastics are commonly cast with a resin which undergoes a catalyst induced reaction in 'setting' and does not require the application of heat. Injection molding, in contrast, involves melting plastic chips behind the barrel of an injection machine and forcing the melt under considerable pressure into the necessarily closed and preferably two part mold. It is also preferred that a two part mold be used in casting because two parts, as opposed to three, four or more parts, can be readily cooled, disassembled, and reassembled automatically.

Molding is also considered the most economic means known for manufacturing these components but certain problems inherent to manufacture of the three basic components of a rotary shaft coupling utilizing perpendicular transverse substantially cylindrical engagements by this means are recognized. Use of a medial component presenting both female engagements is suspected of difficulty because the idea was put forth in an infeasible manner. If the component is injection molded both the shape and the depth of the two perpendicular transverse substantially cylindrical cavities open to either of the two opposed faces are recognized as imposing severe difficulties. The two female engagements cannot overlap or the engaging male members on the terminal components cannot both fully engage the medial component. And the two cannot easily avoid overlapping each other without increasing the thickness of the medial component well past the point of being 'disk shaped' which is considered in the prior art to be necessary.

To avoid warping consequent to cooling of widely varying cross sections a medial component presenting both female engagements would need to be over three times the depth of each substantially cylindrical cavity to avoid having most of the component being over 'one and one half times as thick' as the portion remaining behind either of the two substantially cylindrical cavities is otherwise necessarily of lesser thickness than the cavity. This would result in a much thicker medial component in accordance with the prior art that is considered infeasible.

The shape of the two opposed transverse substantially cylindrical cavities required of the coupling also presents a large difficulty to manufacture by injection molding. The depths of the undercuts on either side of the cavity must be minimized, as clearly seen to be the case in U.S. Pat. No. 4,941,861, in order to use an axially aligned two part mold. This enables each part of the mold having the positive form of the cylindrical member to be removed axially from the cooled part.

This principle also holds in molding of the male members in an conventional axially aligned two part mold as again clearly seen to be the case in both the male and female engagement members in U.S. Pat. No. 4,941,861. There is no additional undercut to the substantially cylindrical form in either case as the cylindrical form simply intersects the proximate flat surface. This minimizes the variation in cross sectional thickness of the molding as does use of male rather than female opposed engagements required of the medial component which aspects are both hence seen to be inherent to a rotary shaft coupling using these three basic components each manufactured by conventional injection molding using axially aligned two part molds.

Minimization of the undercut of both positive substantially cylindrical forms required of conventional injection molding with an axially aligned two part mold, however, results in substantially flush opposed faces in engagement as clearly seen in U.S. Pat. No. 4,941,861 which effectively eliminates the spacing between these surfaces required of a fundamental action desired of this type of coupling: pivoting about each axis of substantially cylindrical engagement. Each engagement is effectively restricted to lateral displacement and while this accommodates lateral, i.e. offset, misalignment it does not accommodate angular misalignment. It is also considered that restriction to lateral displacement exacerbates that motion thereby necessitating additional features to restrict the same.

Statement of Need

Because it is desirable to mold, preferably with a two part mold, each of the three basic components of a rotary shaft coupling utilizing perpendicular transverse substantially cylindrical engagements and obtain a coupling which is relatively unrestricted in accommodating both angular and parallel misalignment it is considered that a need exists for such a coupling which further preferably does not require additional features to prevent undesired lateral displacement and which permits use of a medial component presenting both female engagements having a thickness of less than three times the depth of the substantially cylindrical engagements provided.

SUMMARY OF THE INVENTION

Objects of the Invention

The encompassing object of the present invention is to provide a rotary shaft coupling having three basic components utilizing perpendicular transverse substantially cylindrical engagements which is relatively unrestricted in accommodating both angular and parallel misalignment.

A primary auxiliary object of the present invention is to mold three basic components of a rotary shaft coupling utilizing perpendicular transverse substantially cylindrical engagements which is relatively unrestricted in accommodating both angular and parallel misalignment.

A secondary auxiliary object of the present invention is to utilize two part molds in molding three basic components of a rotary shaft coupling utilizing perpendicular transverse substantially cylindrical engagements which is relatively unrestricted in accommodating both angular and parallel misalignment.

A primary ancillary object of the present invention is to provide a rotary shaft coupling utilizing perpendicular transverse substantially cylindrical engagements which is relatively unrestricted in accommodating both angular and parallel misalignment having two terminal components and one medial component presenting both substantially cylindrical transverse cavities perpendicularly disposed on opposed faces.

A secondary ancillary object of the present invention is to provide a rotary shaft coupling utilizing perpendicular transverse substantially cylindrical engagements which is relatively unrestricted in accommodating both angular and parallel misalignment having two terminal components and one medial component presenting both substantially cylindrical transverse cavities perpendicularly disposed on opposed faces possessing a thickness less than thrice the depth of each said cavity.

Another secondary ancillary object of the present invention is to provide a rotary shaft coupling utilizing perpendicular transverse substantially cylindrical engagements which is relatively unrestricted in accommodating both angular and parallel misalignment which does not have additional features to retard lateral displacement of each engagement.

Principles Relating to the Present Invention

In achievement of the above stated objectives a rotary shaft coupling comprised of one medial component having two opposed perpendicular transverse substantially cylindrical cavities, hereinafter known for the sake of brevity as transverse cavities, and two terminal components each having one transverse substantially cylindrical extension, hereinafter known for the sake of brevity as a transverse extension, spaced apart from the adjacent face by a reduced section transverse foot is suggested. With each terminal component molded with a part line parallel the shaft axis bisecting the transverse extension, including the reduced section transverse foot, use a two part mold is enabled. Spacing of the transverse extension apart from the adjacent face of each terminal component also facilitates minimization of the width of the medial component and molding of the same with a two part axially aligned mold with a part line about the equator of a substantially cylindrical body having a thickness of only slightly more than twice the depth of either transverse cavity.

It is further specifically suggested that the medial component with the two perpendicularly opposed transverse cavities be molded by injection molding preferably using a two part mold with part line effected upon the equator of the substantially cylindrical body as suggested above. Use of a relatively dense, high quality, thermoplastic is also recommended. Use of relatively large diameter transverse cavities with respect to the body diameter, no additional undercutting with respect to the adjacent surface, and minimal body between the central crossing of these relatively large transverse cavities results in a generally waved configuration of sufficiently uniform cross section for accurate injection molding with a simple two part axially aligned mold.

For each terminal component it is also further specifically suggested that a substantially cylindrical body, with one transverse extension and reduced section foot spacing the same apart from the adjacent interior face and a bore for a shaft end on the opposed exterior face, be molded in metal. It is preferred that die casting be utilized, specifically die cast zinc with a nickel plating, but other materials and other types of molding can be utilized with economic molding of this component ensured by use of a two part mold with the part line bisecting the transverse extension and foot.

Use of an injection molded thermoplastic medial component with transverse cavities having no additional undercut together with terminal components each die cast in metal and possessing a transverse extension spaced apart from the adjacent interior surface by a reduced section foot also enables both lateral sliding and axial compression assembly and disassembly. In addition, favorable surface engagement characteristics are readily obtained in opposing the resilient plastic body presenting the transverse cavities to the rigid metal transverse extension. Injection molding and die casting both possess superior accuracy in production which can ensure a very close compressed fit of the transverse extension within each transverse cavity by the body of the medial component.

The essential configuration inclusive of the transverse extension spaced apart from the adjacent interior surface of each terminal component and two perpendicular transverse cavities presented by opposed faces of the medial component without additional offset accommodates both large parallel and angular shaft misalignments. Parallel misalignments of ten percent of the basic coupling diameter are readily accommodated as are angular misalignments of five degrees at shaft speeds up to 3,000 revolutions per minute (rpm). A coupling in accordance with the principles relating to the present invention is also readily utilized for transmission of reciprocating force rather than torque. Further advantages may be appreciated with reading of the detailed discussion below; especially with reference to the drawings appended hereto and briefly discussed directly below.

BRIEF DESCRIPTION OF THE DRAWINGS

FIG. 3 is an isometric view of an axially separated transverse cylindrical engagement tripartite flexible coupling in accordance with the principles relating to the present invention illustrating compression assembly and tension disassembly.

FIG. 4 is an isometric view of laterally disengaged terminal and medial components of a transverse cylindrical engagement tripartite flexible coupling in accordance with the principles relating to the present invention illustrating lateral assembly and disassembly.

NOMENCLATURE

| | | | |
|---|---|---|---|
| 10 | flexible shaft coupling | 15 | set screw |
| 11 | part line | 16 | adjacent end surface (to |
| 12 | terminal component | | extension) |
| 13 | medial component | 17 | adjacent end surface (to cavity) |
| 20 | transverse extension | 19 | nether end surface |
| 21 | transverse extension diameter | 30 | transverse cavity |
| 22 | terminal component body | 31 | transverse cavity diameter |
| 23 | reduced width foot | 32 | medial component body |
| 25 | radial, threaded, aperture | 33 | nominal body diameter |
| 26 | external cylindrical surface | 35 | plating |
| 27 | interior radial surface | 36 | internal cylindrical surface |
| 29 | shaft bore | 37 | radial extension |
| | | 39 | keyway |

DETAILED DESCRIPTION OF PREFERRED EMBODIMENT

Figure 1:
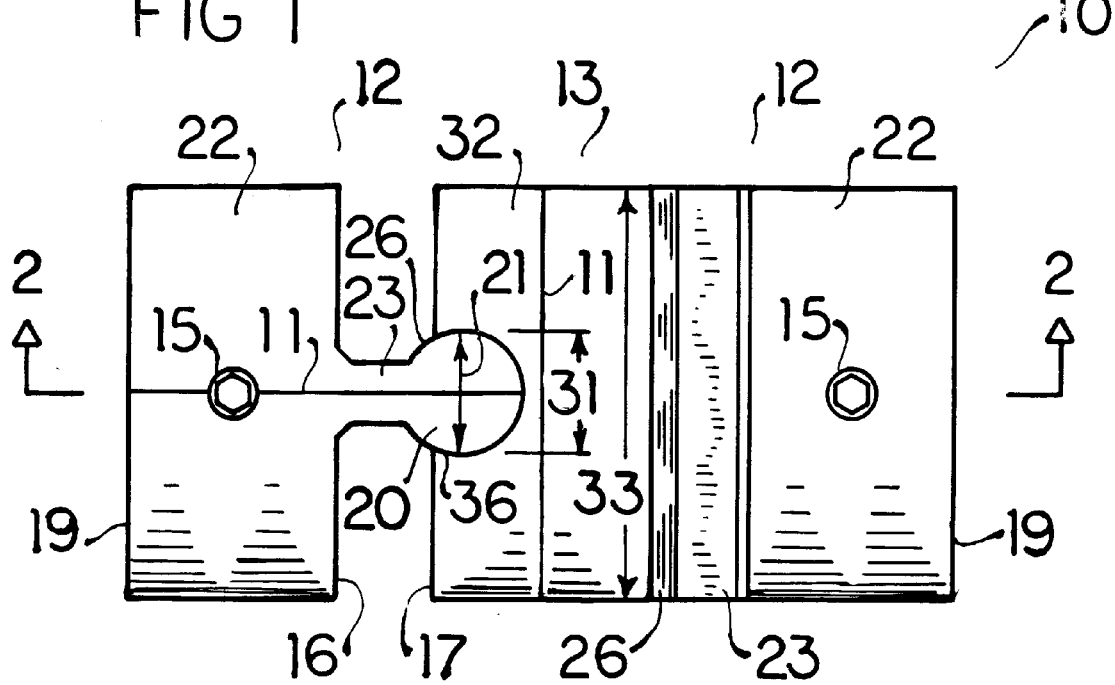
FIG. 1 is a plain elevational view taken from a side of a fully engaged transverse cylindrical engagement tripartite flexible coupling in accordance with the principles relating to the present invention.
Figure 2:
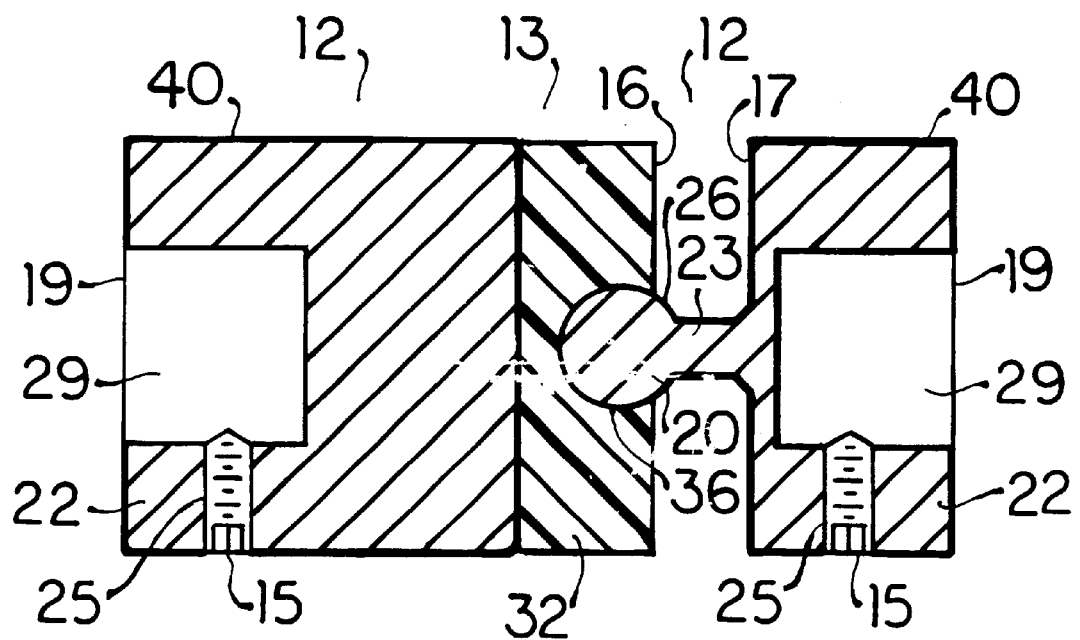
FIG. 2 is a cross sectional view of the fully engaged transverse cylindrical engagement tripartite flexible coupling shown in FIG. 1.

FIGS. 1 & 2 depict a fully engaged, or assembled, transverse cylindrical engagement flexible shaft coupling 10 in accordance with the principles relating to the present invention comprised of three main parts: two terminal components 12 and one medial component 13 each possessing a part line 11 as a result of molding with a two part mold. It will be noticed that the part line 11 on the medial component 13 is normal, i.e. perpendicular to, the axis of the coupling 10 and hence the mold is axially aligned while the part line 11 on each terminal component 12 is parallel the axis of the coupling 10 and hence the mold is radially aligned. It will also be noticed that the part line 11 on each terminal component 12 bisects the transverse extension 20 and the reduced width foot 23 spacing the same apart from the adjacent end surface 16 of the body 22 which aspect facilitates molding of this configuration with a two part mold. The transverse extension 20 possesses an external cylindrical surface 26 including a diameter 21 greater than the substantially uniform width of the reduced width foot 23 which together can not readily be molded with an axially aligned mold.

Each transverse extension 20 engages one of two opposed perpendicular substantially cylindrical transverse cavities 30 each possessing an internal cylindrical surface 36. Both of these engagements can be obtained with a sliding lateral motion as depicted in FIG. 4 and accommodate large lateral shaft misalignment. Both of these engagements further accommodate large angular shaft misalignment owing to the spacing of the cylindrical transverse extension 20, and the external cylindrical surface 26, apart from the adjacent end surface 16 with the reduced width foot 23. This spacing also enables the medial component 13, as best seen in FIG. 3, to be made without an additional undercut wherein the internal cylindrical surface 36 of each transverse cavity 30 simply intersects the adjacent end surface 17 a small distance beyond the full transverse cavity diameter 31.

This configuration facilitates both release of the part from a two part axially aligned mold and press in, or compression, assembly and pull out, or tension, disassembly as indicated in FIG. 3. Compression assembly is further facilitated by use of injection molded thermoplastic for the medial component 13 and die cast metal for the terminal components 12 as the superior rigidity of the resulting transverse extension 20 including the reduced width foot 23 and the convex shape of the exterior cylindrical surface 16 cause, in compression, yielding of the medial component body 32 preferred to obtain a tight engagement of the transverse extension 20 in the transverse cavity 30.

It is further noted, with regard to the configuration of the medial component 13, that the diameter 31 of each transverse cavity 30 is over one quarter the diameter 33 of the body 32 of the medial component 13. This facilitates injection molding of the medial component 13 with a relatively small thickness, slightly more than twice the depth of each transverse cavity 30, slightly less than the diameter 31 of the transverse cavity 30, as the thickness of the body 32 between the two transverse cavities 30 is less than combined loss of the transverse cavity diameter 31 axially determined by the intersection of the interior cylindrical surface 36 with the adjacent end surface 17. A basic wave configuration of adequately uniform cross sectional thickness of the medial component body 32 is obtained which is readily injection molded with an axial two part mold.

As an example, a transverse cylindrical engagement flexible coupling 10 in accordance with the principles relating to the present invention with a nominal diameter 33 of half an inch for the terminal and medial component bodies 22, 32 further preferably possessing a transverse extension 20 and cavity 30 both having a diameter 21,31 of approximately 0.145", or 0.29 of the nominal diameter 33, is considered.

This is compared with an medial body 32 thickness of 0.265" or slightly over half of the nominal diameter 33 and less than twice the diameter 31, 0.290", of the internal cylindrical surface 36 of the transverse cavity 13. The depth of each transverse cavity 13 is 0.120" leaving 0.025" of medial body 13 at the center between the spaced overlapping of the two perpendicular transverse cavities 30. The mating terminal components 12 in this example have a shaft bore 19 of 0.235", a cylindrical body 22 thickness between adjacent and nether faces 16, 19 of 0.250", and an reduced width foot 23 extending axially from the adjacent end surface 16 approximately 0.55" for an overall axial length, including the transverse extension diameter 21, 0.145", of 0.450".

Figure 5:
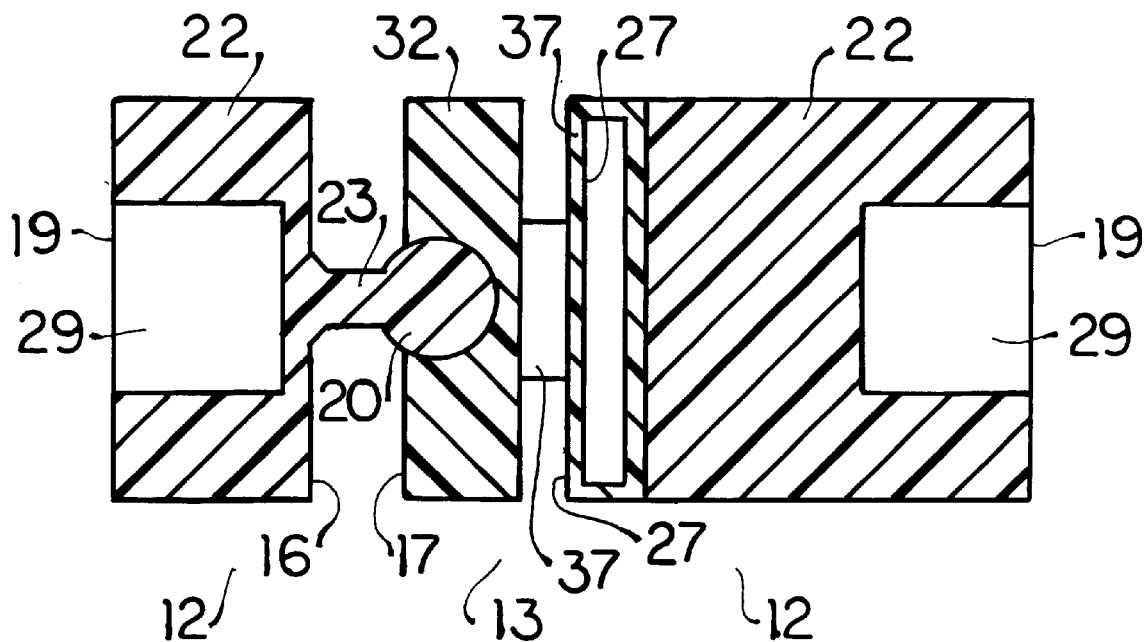
FIG. 5 is a cross sectional view of a fully engaged transverse cylindrical engagement tripartite flexible coupling in accordance with the principles relating to the present invention including a flexible medial component.

With regard to rotationally securing each terminal component 12 onto the end of a shaft use of two set screws 15 each threaded through one of two radial, threaded, apertures 25 of the cylindrical body 22 intersecting the shaft bore 19 in a perpendicular relation to each other is recommended particularly if the terminal component bodies 22 are metal as preferred and as shown in FIG. 2. A clamp collar type rotational securement, which has at least one bolt compressing a radial slit through the body 22 to the bore shaft 29, is also suggested, but if the bodies 22 are die cast in metal radial, threaded, apertures 25 for set screws 25 are considered more economic. If the bodies 22 are molded in plastic, as shown in FIG. 5, a collar type of securement, not shown, is preferred largely because threading would be easily stripped by set screws 15. A metal bushing disposed within the shaft bore 29 possessing tapped apertures readily overcomes this problem and hence set screws 15 are considered good for metal or plastic bodies 22. The shaft bore 29, which is preferably blind as seen in FIGS. 2 & 5 and open to the nether face 19 as seen in FIGS. 2–6, is preferably cast with an axially aligned mold insert while the radial apertures are drilled and tapped in secondary operations. Hexagonal socket head screws are suggested for the set screws 15.

A flexible shaft coupling 10 having two pairs of perpendicular transverse cylindrical engagements in accordance with the principles relating to the present invention can preferably be assembled with axially applied compression and disassembled with axially applied tension as indicated in FIG. 3. With zinc die cast terminal components 12 with a nickel plating 35 and an injection molded medial component 13 of high quality engineering thermoplastic a transverse cylindrical engagement for a smaller coupling 10 such as the half inch nominal body diameter 33 used in the example above requires about 3 kg to press together or pull apart and safely transmits 3 kgfcm of torque. This is with a smooth shaft bore 29. Larger diameter shaft couplings 10 have slightly larger loads for engagement than for dismantling: a coupling 10 with one inch nominal diameter 33 and maximum torque of 45 kgfcm requires 16.4 kgf compression and 13.8 kgf tension. Fitted with a stainless steel cover for an injection molded thermoplastic medial component 13 these values increase to 60 kgfcm of torque, 17.5 kgf for compression engagement, and 16.5 kgf for tension disengagement.

Flexible shaft couplings 10 in accordance with the principles relating to the present invention are primarily intended for transmitting torque, i.e. for use on rotary shafts, but can be utilized for transmitting reciprocating force as well in which case no rotational securement means are necessary and the lateral misalignment between shafts accommodated is substantially increased. A smaller shaft coupling 10 such as the half inch example cited above readily accommodates up to a 1.5 mm (0.060") of parallel shaft misalignment and a three quarter inch (18 mm) diameter 33 coupling 10 accommodates 2.4 mm of parallel shaft misalignment; both running up to 3,000 rpm. If used to transmit reciprocating force a much greater parallel misalignment, approximately one quarter of the nominal body diameter 33 or 0.125"(3 mm) for a half inch diameter, is accommodated.

Most importantly, both the parallel shaft misalignment and the angular shaft misalignment can be accommodated in combination by a flexible coupling 10 in accordance with the principles relating to the present invention while transmitting torque in a rotary application. In a reciprocating application the relative lateral displacement of either transverse extension 20 relative the engaged transverse cavity 30 is static. In a rotary application transmitting torque this displacement is constantly changing as is the relative angle of engagement from axial if angular misalignment also exists between the two shafts concerned. This is considered extremely important because the terminal components 12 are each rotationally fixed with respect to one rotating shaft and the movement of the medial component 13 in adjustment both laterally and angularly relieves the stresses that typically cause shaft coupling failure.

Perpendicular disposition of the two transverse substantially cylindrical engagements is necessary for this action but there is no need to restrict lateral or angular displacement in operation. Indeed, unless angular and lateral displacement of each engagement is unrestricted, the coupling 10 cannot instantaneously correct for shaft misalignments properly. Frictional resistance to the displacement of the medial component 13 laterally or angularly with respect to both terminal components is desirable but this resistance must be proportional to the displacement effected and a physical stop or catch limiting this displacement is both unnecessary and undesirable.

FIG. 4 depicts, as previously mentioned, sliding engagement and disengagement of a substantially cylindrical transverse extension 20 of a terminal component 12 with a cylindrical transverse cavity 30 of a medial component 13 of a flexible shaft coupling in accordance with the principles relating to the present invention. The medial component 13 is consistent with that seen in FIGS. 1–3 but contrasted to the medial component 13 seen in FIG. 5 which has a body 32 which is substantially cylindrical but is not solid. A generally cylindrical shape facilitates manufacture and obtainment of a rotationally balanced neutral configuration which is obviously desirable. A solid medial body 32 is also obviously easier to mold and preferred for reciprocating applications but an open, more flexible, medial body 32 assists in the accommodation of stresses in a manner similar to the displacement angularly and laterally by the medial component 13 discussed above.

The open, more flexible, medial component 13 depicted in FIG. 5 is shown in aligned engagement with two terminal components 12 as a full coupling 10 in accordance with the principles relating to the present invention. The open, more flexible, medial component 13 is seen in this figure to possess a central thin radial section having two opposed interior radial surfaces 27 contiguous with four perpendicularly disposed radial extensions 37 connecting this central thin radial section to the split main body 32 of the medial component 13 in perpendicularly opposed pairs with one pair extending parallel to the axis from either half of the split main body 32.

This open, more flexible, medial component 13 can not be injection molded with a simple, axially aligned, two part mold but is readily manufactured by injection molding using a complex multiple part mold. This structure and manufacture comprises what is considered to be the subject matter of another invention by the present inventor and is not detailed herein. It is referred to herein simply as a medial component 13 which, in possessing two perpendicular transverse cylindrical cavities 30 engaging a transverse cylindrical extension 20 spaced apart from the adjacent end surface 16 of a terminal component, is in full accordance with the principles relating to the present invention. It is also noted that, as seen in FIG. 5, both terminal components 12 in addition to the medial component 13 are constructed in plastic.

This is readily accomplished with a two part radially aligned mold leaving a part line 11, as seen in FIGS. 1, 3 & 4, parallel the axis and bisecting the transverse extension 20 and the reduced width foot 23. The characteristics of a molded plastic terminal component 12 are not the same as a cast metal terminal component 12 but the differences do not affect operation. The coupling 10 can still be assembled and disassembled with either axially directed forces, as seen in FIG. 3, or laterally directed forces, as seen in FIG. 4. Angular and lateral displacement, against a resistance which is proportional with the displacement, is still readily made in accommodation of angular and lateral shaft misalignments. For all intents and purposes, therefore, the material utilized for the terminal components 12 doesn't substantially affect operation. The configuration is determinative.

It is also noted that while the terminal components 12 must be molded, which process expressly includes casting, with an radially aligned mold so that the resultant part line 11 is parallel to the axis and bisects the transverse extension 20, the medial component 13 can readily be machined. While it is generally considered necessary that the medial component 13 be made of a resilient material such as plastic, and it is recognized that injection molding is less expensive than machining, the solid configuration of the medial component 13 seen in FIGS. 1–4 is quite readily machined with two perpendicular drillings of a short length of extruded plastic bar stock. It is also noted that reinforcement of a solid, plastic, medial component 13 with an exterior metal sleeve is readily effected and that this results in higher operating speeds, e.g. 5,000 rpm vs. 3,000.

Figure 6:
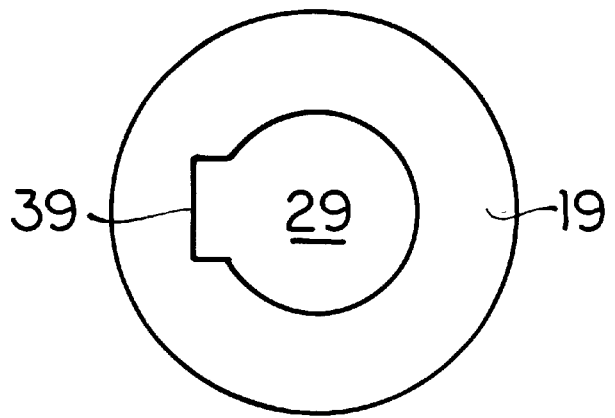
FIG. 6 is an end view of a terminal component of a transverse cylindrical engagement tripartite flexible coupling in accordance with the principles relating to the present invention illustrating a shaft bore with a keyway.

FIG. 6 depicts the nether face 19 of a terminal component 12 with a shaft bore 29 possessing a keyway 39 which an alternative means of securing a shaft rotationally with respect to a terminal component 12. The shaft, of course, must have a congruent key projecting radially in substantially parallel axial extension to fit the keyway 39 in order to operate properly. Use of axially oriented splines projecting radially from a shaft into congruent splines along the shaft bore 29 is another related example. In contrast to the use of set screws 15 in tapped apertures 25 intersecting the shaft bore 29 it is unimportant as to what material is utilized for the body 23 of the terminal component 12 in the case of a keyway 39 or splines.

And, as mentioned previously, a clamping collar type securement which is actually preferred for a terminal component 12 made of plastic. But it is preferred to cast the terminal component 12 in metal and to use set screws 15 as discussed above to secure the same to a rotating shaft. The shaft coupling 10 depicted in FIG. 5, therefore, illustrates the latitude of design and construction feasible within the restrictions imposed by the principles relating to the present invention and an illustration of the intention in the foregoing to provide what is considered to be the best known manner of making and using an embodiment in accordance with those principles.

This description is not intended to restrict in any manner the invention disclosed herein and is not to be interpreted in any manner as restrictive of such or the rights and privileges obtained by Letters Patent for which I claim:

1. A flexible shaft coupling, primarily intended for accommodating large angular and large lateral shaft misalignments during the transmission of torque in connection of two rotary shafts, said flexible shaft coupling comprising:

a medial component possessing a substantially cylindrical body, two perpendicular transverse cavities each bounded by an internal substantially cylindrical surface and an opening of uniform width upon one of two opposed adjacent end faces, said internal substantially cylindrical surface including a diameter greater than said uniform width of said transverse opening;

two terminal components each possessing a substantially cylindrical body, a shaft bore open to a nether end face, and a transverse extension from an adjacent end face opposed to said nether face possessing an external substantially cylindrical surface spaced apart from said adjacent face by a reduced width foot possessing a substantially uniform width of lesser dimension than said width of said opening of said transverse cavity, said substantially cylindrical body being molded in a two part radially aligned mold with a part line bisecting said transverse extension and said reduced width foot;

said external substantially cylindrical surface of each said terminal component including a diameter substantially equal to said diameter included by said internal substantially cylindrical surfaces of said medial component and each said transverse extension fitting in one said transverse cavity;

the adjacent end face of each said terminal component being spaced apart from an adjacent end face of said medial component and each said external substantially cylindrical surface contacting one said internal substantially cylindrical surface with each said transverse extension engaged with one of said two opposed transverse cavities in a manner allowing lateral displacement and pivoting of each said terminal component with respect to said medial component.

2. The flexible shaft coupling of claim 1 wherein said medial component body possesses an open construction including a central thin radial section having two opposed interior radial surfaces contiguous with four perpendicularly disposed radial extensions connecting said central thin radial section with both parts of a split main body.

3. The flexible shaft coupling of claim 1 wherein said medial component body is made of a relatively resilient material and said terminal component bodies are made of a relatively rigid material.

4. The flexible shaft coupling of claim 1 wherein at least one said shaft bore has a keyway.

5. The flexible shaft coupling of claim 1 wherein the terminal component bodies are molded in plastic.

6. The flexible shaft coupling of claim 1 wherein the terminal component bodies are die cast in metal.

7. The flexible shaft coupling of claim 5 wherein both said terminal component bodies have exterior plating.

8. The flexible shaft coupling of claim 1 wherein at least one said terminal component has rotation securement means for rotationally securing the terminal component to a shaft fitted in said shaft bore.

9. The flexible shaft coupling of claim 8 wherein said rotation securement means is comprised of an axially aligned keyway in said shaft bore.

10. The flexible shaft coupling of claim 8 wherein said rotation securement means is comprised of at least one set screw threaded through a radial, tapped, aperture open to said shaft bore.

11. The flexible shaft coupling of claim 10 wherein said securement means is comprised of two set screws threaded into perpendicular radial, tapped, apertures each open to said shaft bore.

12. The flexible shaft coupling of claim 1 wherein the internal substantially cylindrical surface possessed by each said transverse cavity intersects one adjacent end face and each said transverse cavity possesses a depth of lesser dimension than said diameter included in said internal substantially cylindrical surface.

13. The flexible shaft coupling of claim 12 wherein said medial component body possesses an axial width of less than thrice said depth of each said transverse cavity.

14. The flexible shaft coupling of claim 13 wherein said medial component body possesses an axial width of less than twice said diameter included in said internal substantially cylindrical surface.

15. The flexible shaft coupling of claim 12 wherein said substantially cylindrical body of said medial component possesses a diameter less than six times as large as each said diameter included in said internal substantially cylindrical surfaces.

16. The flexible shaft coupling of claim 15 wherein said substantially cylindrical body of said medial component possesses a diameter less than four times as large as each said diameter included in said internal substantially cylindrical surfaces.

17. The flexible shaft coupling of claim 12 wherein said medial component body is molded in plastic.

18. The flexible shaft coupling of claim 17 wherein said medial component body is injection molded in thermoplastic.

19. The flexible shaft coupling of claim 18 wherein said medial component body is injection molded with an axially aligned mold in thermoplastic.

20. The flexible shaft coupling of claim 19 wherein said medial component body is injection molded with an axially aligned two part mold in thermoplastic.

* * * * *